(12) United States Patent
Tong et al.

(10) Patent No.: US 8,739,106 B2
(45) Date of Patent: May 27, 2014

(54) COMPUTER MOTHERBOARD AND CPU VOLTAGE REGULATOR POWER SUPPLY LAYOUT METHOD

(75) Inventors: Song-Lin Tong, Guangdong (CN); Ling-Ling Shen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 465 days.

(21) Appl. No.: 13/069,396

(22) Filed: Mar. 23, 2011

(65) Prior Publication Data

US 2012/0173892 A1    Jul. 5, 2012

(30) Foreign Application Priority Data

Dec. 30, 2010  (CN) .......................... 2010 1 0614598

(51) Int. Cl.
*G06F 17/50* (2006.01)

(52) U.S. Cl.
USPC ........................................................ 716/132

(58) Field of Classification Search
USPC .................................................. 716/100, 132
See application file for complete search history.

(56) References Cited

U.S. PATENT DOCUMENTS

| | | | | |
|---|---|---|---|---|
| 6,075,424 A | * | 6/2000 | Hampel et al. | ................ 333/161 |
| 6,104,182 A | * | 8/2000 | Jurisch et al. | ................ 324/142 |
| 2009/0295357 A1 | * | 12/2009 | Lin et al. | ....................... 323/285 |

* cited by examiner

*Primary Examiner* — Suchin Parihar
(74) *Attorney, Agent, or Firm* — Novak Druce Connolly Bove + Quigg LLP

(57) ABSTRACT

A computer motherboard includes a motherboard substrate defining a CPU loading area and a CPU voltage regulator power supply layout area. The power supply layout area is equally divided into a number of phase regions, and each of the phase regions has a number of spaced circuit layers. The circuit layers in the phase regions are symmetrical about a central axis of the CPU loading area, and a difference between each two simulating impedances between an impedance center of each of the phase regions and a loading center of the CPU loading area is within 1%.

10 Claims, 4 Drawing Sheets

COMPUTER MOTHERBOARD AND CPU VOLTAGE REGULATOR POWER SUPPLY LAYOUT METHOD

BACKGROUND

1. Technical Field

The present disclosure relates to computer motherboards, and particularly to a computer motherboard with a central processing unit (CPU) voltage regulator, and a power supply layout method for the computer motherboard CPU voltage regulator.

2. Description of Related Art

A typical computer motherboard CPU voltage regulator (VR) usually includes circuits in parallel connection to supply poly-phase electrical power to CPU. Such circuits are usually in a same layout so as to balance current output to the CPU, otherwise metal oxide semiconductor field effect transistor (MOSFETs) in the circuits may be damaged.

However, such typical voltage regulator power supply layouts only consider symmetrical power element layout configurations, which are insufficient for balancing poly-phase current output.

What is needed, therefore, is a computer motherboard and a CPU voltage regulator power supply layout method, which can overcome the above shortcomings.

BRIEF DESCRIPTION OF THE DRAWINGS

Many aspects of the present computer motherboard and CPU voltage regulator power supply layout method can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present computer motherboard and CPU voltage regulator power supply layout method will now be described in detail below and with reference to the drawings.

Figure 1:
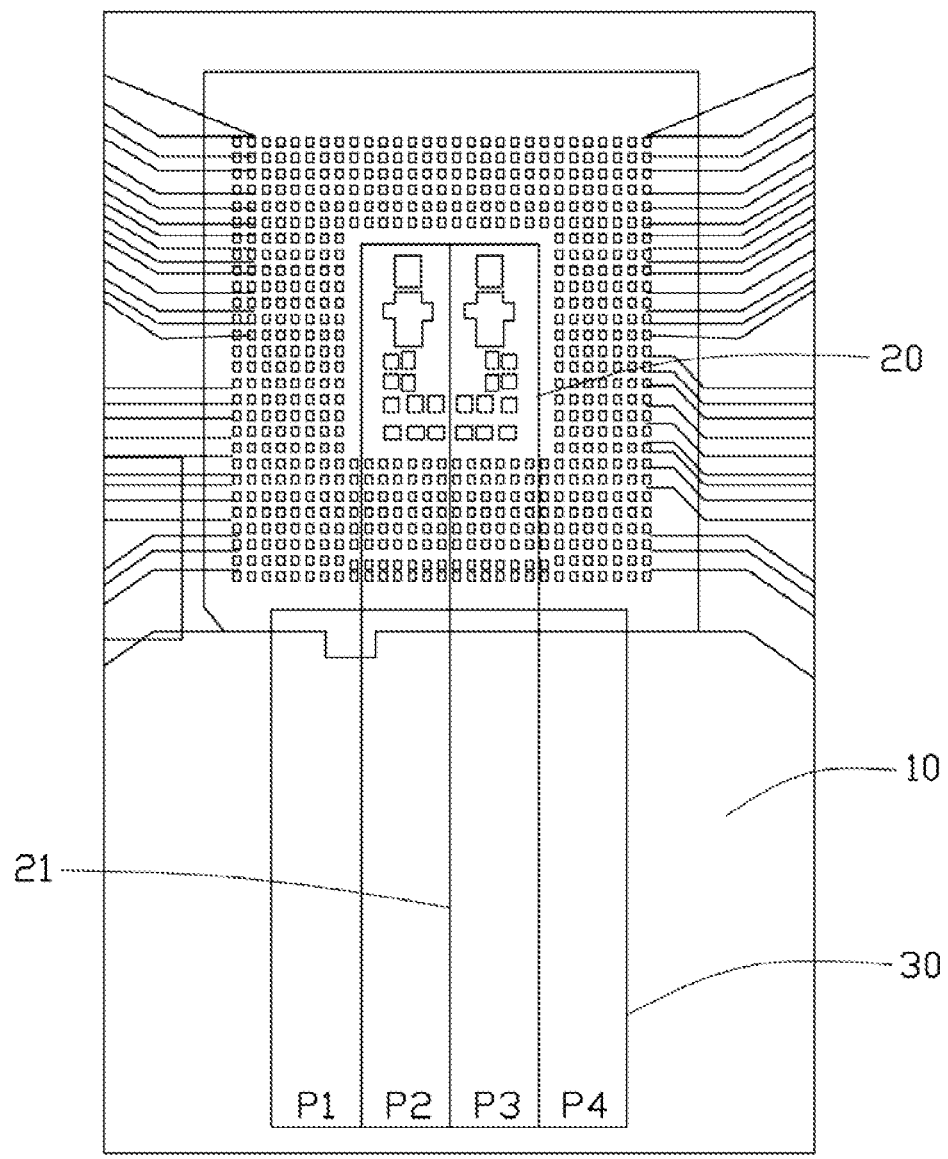
FIG. 1 is a schematic plan view of a computer motherboard substrate in accordance with one embodiment, the motherboard substrate defining four phase regions P1-P4 for supplying power.
Figure 2:
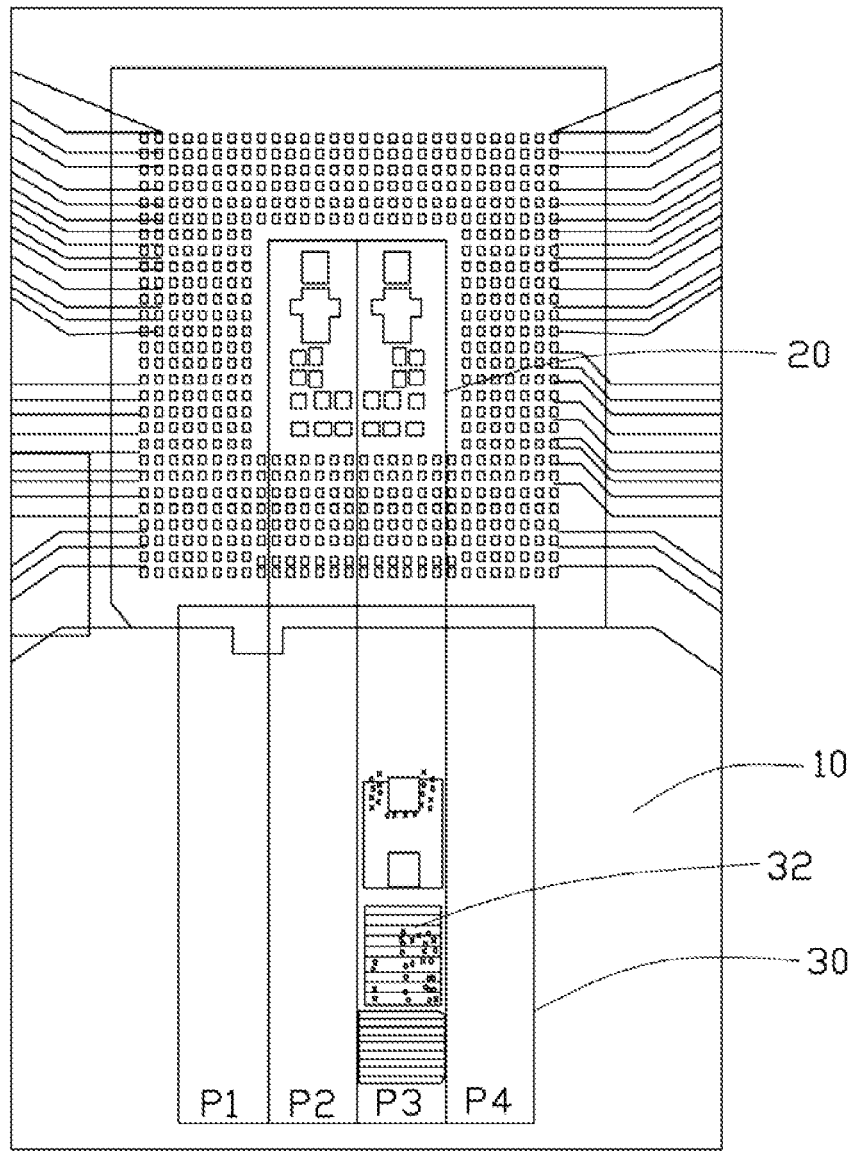
FIG. 2 shows circuit layers that are formed in one of the phase regions of FIG. 1.
Figure 3:
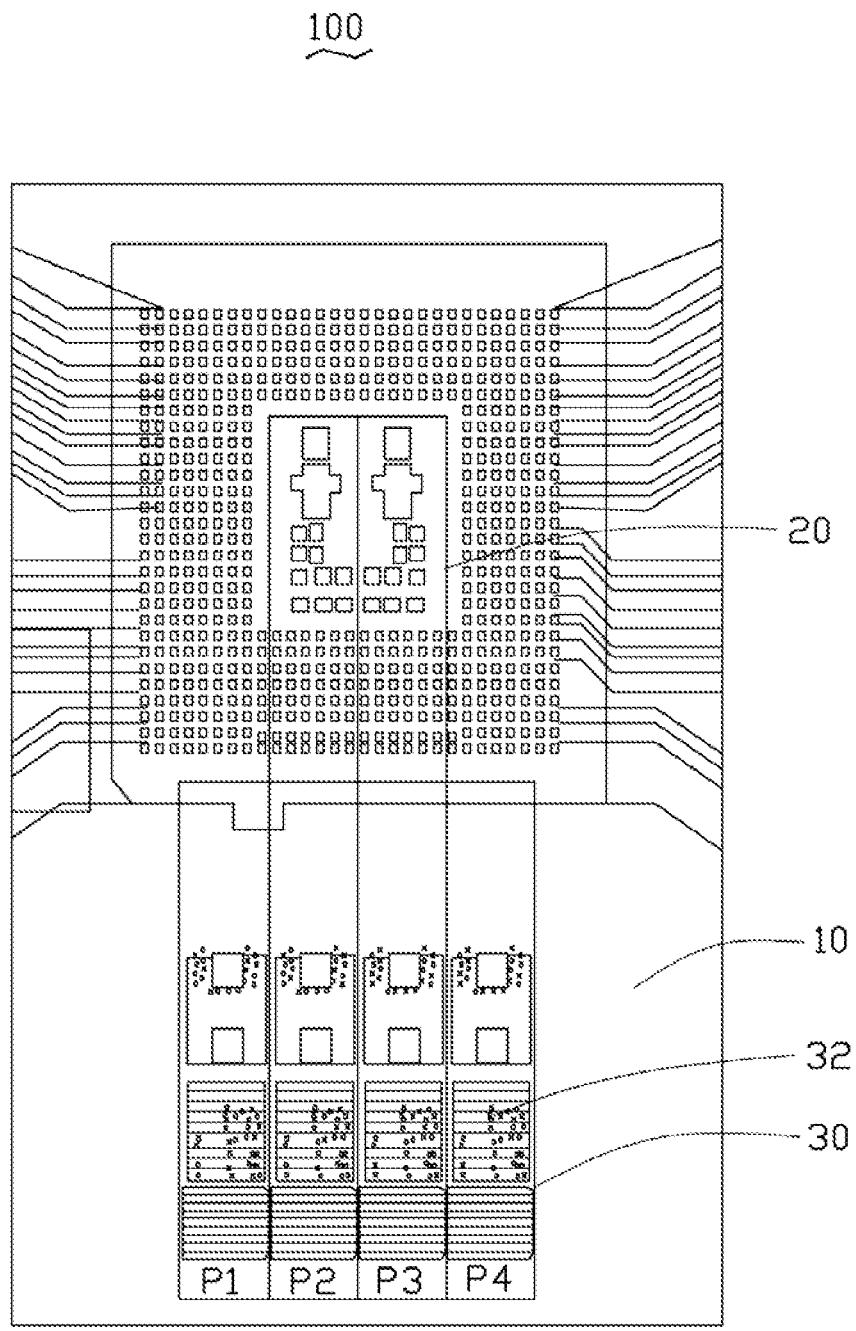
FIG. 3 is similar to FIG. 2 but showing that all four phase regions have the same circuit layers.

Referring to FIGS. 1-3, a computer motherboard 100 includes a motherboard substrate 10 with a CPU loading area 20 and a CPU voltage regulator power supply layout area 30.

Figure 4:
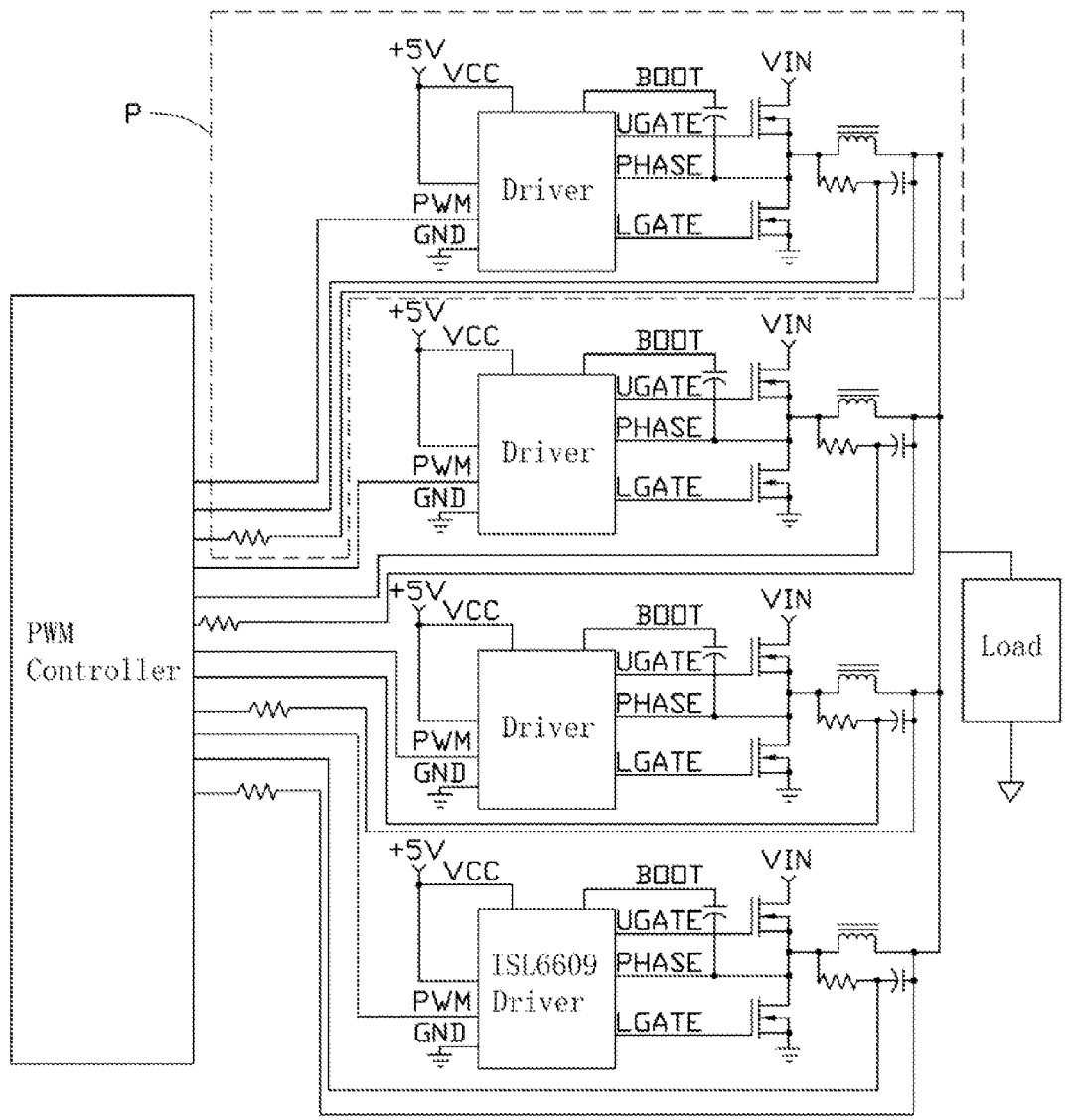
FIG. 4 is schematic of an exemplary CPU voltage regulator with four power circuits.

In the present embodiment, a CPU voltage regulator power supply of the motherboard 100 includes four circuits arranged in parallel connection as circuits P in FIG. 4. The CPU loading area 20 may have one or more CPU sockets. The power supply layout area 30 is arranged near the CPU loading area 20, thus shortening distance between the CPU voltage regulator and a CPU, and simplifying circuits of any power elements of the CPU voltage regulator.

The power supply layout area 30 is equally divided into four phase regions P1, P2, P3 and P4, that can be controlled to supply 4-phase electrical power to a load such as a CPU, and are symmetrically arranged about a central axis 21 of the CPU loading area 20. Circuit layouts are the same for each phase region P1-P4. There may be stacked circuit layers 32 in each of the phase regions P1-P4, which may include at least a signal layer, a ground layer, and a power layer stacked in an order according to need. One or more additional power layers may be applied on each of the phase regions P1-P4 after the above circuit layers 32 have been formed. Insulating material may be applied between adjacent circuit layers 32, and vias (not labeled) may be formed in the circuit layers 32 for facilitating electrical connection between the circuit layers 32. Impedances between an impedance center of each of the phase regions and a loading center of the CPU loading area are within 1% of each other as determined using simulation software.

It is understood that the number of the phase regions can be changed according to need. If an odd number of phase regions are needed, a central phase region can symmetrically straddle the axis line 21 of the CPU.

A power supply layout method for the computer motherboard CPU voltage regulator may follows the following steps.

First, a power supply schematic is provided, see FIG. 4. FIG. 4 shows that each of the four phase circuits P have the same power supply layout. The "PHASE" labels in FIG. 4 indicate the phase leading pin of a phase circuit.

Second, a motherboard substrate 10 is provided. The motherboard substrate 10 defines a CPU loading area 20 and a CPU voltage regulator power supply layout area 30.

Third, the power supply layout area 30 is equally divided into four phase regions P1, P2, P3 and P4 symmetrically arranged about the central axis 21 of the CPU (see FIG. 1).

Then, forming circuit layers 32 in each of the phase regions P1-P4 (see FIGS. 2 and 3). The circuit layers 32 may be made of copper, and may include at least a signal layer, a ground layer, and a power layer stacked in an order according to need. Insulating material may be applied between adjacent circuit layers 32, and vias (not labeled) may be formed in the circuit layers 32 for facilitating electrical connection between the circuit layers 32.

If vias are needed, the vias are also symmetrically arranged about the central axis 21. The number of the vias in each of the phase regions P1-P4 may be selected according to need to ensure impedances are within the 1% of each other. More particularly, the phase regions which are farther away from the central axis 21 of the CPU loading area 20 may have more vias than the phase regions which are closer to the central axis 21 as determined experimentally using simulation software. In the present embodiment, the phase regions P1 and P4 have 20% vias more than the phase regions P2 and P3.

Finally, using simulation software such as ALLEGRO PCB SI GXL to simulate the motherboard. In this embodiment, impedances are measured from the impedance center of each of the phase regions, which is the position in the phase region where the impedance is substantially radially increased from or radially decreased from, and the loading center of the CPU area. The impedance center may be detected by the simulating software and a determination made if the 1% impedance difference standard is achieved. The loading center of the CPU loading area 20 is decided by the CPU loading position in the CPU loading area 20.

If the impedances are within 1%, then the power supply layout is satisfactory. Otherwise, an additional power layers can be formed in one or more of the phase regions P1-P4 until the differences between impedances are within 1%. In one embodiment, a particular order of the circuit layers 32 has the signal layer formed at the bottom, the ground layer formed on the signal layer, and the power layer formed on the ground layer, then any additional layers stacked on the previously formed power layer. Any additional power layers may also be made of copper, and the thickness of the additional power layers may be different from the previously formed power layer. In other embodiments, the order of the circuit layers 32 can be selected according to need.

The 1% or less difference between impedances is more suitable for use in with poly-phase circuits, and the failure rate is lowered.

From the above description, the present disclosure results a more balance among the poly-phase circuits of the computer motherboard 100.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A computer motherboard comprising a motherboard substrate defining a CPU loading area and a CPU voltage regulator power supply layout area, the power supply layout area being equally divided into a plurality of phase regions, and each of the phase regions having a plurality of spaced circuit layers, the circuit layers in the phase regions being symmetrical about a central axis of the CPU loading area, and a difference between each two simulating impedances between an impedance center of each of the phase regions and a loading center of the CPU loading area being within 1%, the impedance center of each of the phase regions being the position in the phase region where the impedance substantially radially increases from or radially decreases from.

2. The computer motherboard of claim 1, wherein the circuit layers comprises at least a signal layer, a ground layer, and a power layer stacked in an order from a surface of the each of the phase regions.

3. The computer motherboard of claim 2, wherein an order of the circuit layers has the signal layer formed at a bottom, the ground layer formed on the signal layer and the power layer formed on the ground layer, and the circuit layers further comprises an additional power layer formed on the power layer in each of the phase regions.

4. The computer motherboard of claim 2, wherein the circuit layers in each of the phase regions have a plurality of vias formed for electrical connection between adjacent circuit layers, and the vias are symmetrical about the central axis of the CPU loading area.

5. The computer motherboard of claim 4, wherein the number of the vias in each of the phase regions is the same.

6. The computer motherboard of claim 4, wherein the number of the vias in the phase regions farer away from the central axis of the CPU loading area is more than that in the phase regions nearer the central axis of the CPU loading area.

7. The computer motherboard of claim 1, wherein the CPU loading area has at least one CPU socket.

8. A CPU voltage regulator power supply layout method, the power supply providing poly-phase electrical power, the method comprising:

providing a motherboard substrate, the motherboard substrate defining a CPU loading area and a CPU voltage regulator power supply layout area;

equally dividing the power supply layout area into a plurality of phase regions;

forming a plurality of circuit layers on one of the phase regions, the circuit layers including at least a signal layer, a ground layer, and a power layer stacked in an order from a surface of each of the phase regions;

forming the same circuit layers to the other phase regions, the circuit layers on the phase regions being symmetrical about a central axis of the CPU loading area;

simulating impedances between an impedance center of each of the phase regions and a loading center of the CPU loading area to determine whether a difference between each of the two simulating impedances is within 1%, wherein the impedance center of each of the phase regions is the position in the phase region where the impedance substantially radially increases from or radially decreases from; and forming an additional power layer in each of the phase regions if the difference between each of the two simulating impedances is beyond 1% until the difference between each of the two simulating impedances is within 1%.

9. The method of claim 8, wherein an order of the circuit layers has the signal layer formed at a bottom, the ground layer formed on the signal layer, and the power layer formed on the ground layer, and the additional layer is formed on the power layer.

10. The method of claim 8, further comprising forming vias in the circuit layers in each of the phase regions for electrical connection between adjacent circuit layers, and the vias being symmetrical about the central axis of the CPU loading area.

* * * * *